April 1, 1952   E. P. SACREY   2,591,614
ROTARY CUTTER HEAD WITH SLOTTED BIT SEATS
Filed March 21, 1950

INVENTOR.
Elmer P. Sacrey
BY Bodell & Thompson
ATTORNEYS

Patented Apr. 1, 1952

2,591,614

UNITED STATES PATENT OFFICE 2,591,614

ROTARY CUTTER HEAD WITH SLOTTED BIT SEATS

Elmer P. Sacrey, Syracuse, N. Y.

Application March 21, 1950, Serial No. 150,859

2 Claims. (Cl. 144—230)

This invention relates to rotatable turning tools, and has for its object a shaper cutter unit embodying a cylindrical blade holder mountable on a spindle, cutter blades seated in lengthwise slots in the blade holder, one blade in each slot, with the cutting edges of the blades movable in different circumferential or orbital paths and also the blades spaced circumferentially so that but one blade is cutting into the work at a time and the cutting edges of the blades enter the work successively.

It further has for its object, a shaper cutter unit embodying a blade holder sleeved on the spindle, cutter blades mounted in parallel lengthwise slots in the holder, one blade in each slot, spacer blocks in the slots to locate the blades so that they cut in different orbital paths, and end disks sleeved on the spindle and interlocked by relative axial movement with the edges of the blades, or the edges of the spacer blocks at the ends of the slots, and means for clamping one end disk toward the other to hold the parts interlocked and to frictionally engage the other end disk against an annular shoulder on the spindle, and thus rotatively couple the cutter unit assembly to the spindle.

It further has for its object, an interlocking means between the cutter blades and axial blade spacer blocks and between end disks on the spindle and the blades and spacer blocks at the ends of the slots, to hold the cutter blades from radial displacement. More specifically, the interlocking means consists of concentric circular teeth, or ribs, on opposing faces of the end disks and arcuate teeth on opposite sides or edges of the cutter blades and on opposite edges of the axial spacer blocks, with the ribs, or teeth, on the disks staggered, and the ribs or teeth on opposite edges of the axial spacer blocks and cutter blades likewise staggered; so that the cutter blades can be adjusted radially on half the width of a tooth by reversing the end disks on the spindle, the top disk for the bottom. The spindle is considered as positioned in upright position.

The invention consists in the novel features and in the combinations and constructions hereinafter set forth and claimed.

In describing this invention, reference is had to the accompanying drawings in which like characters designate corresponding parts in all the views.

Figures 5, 6, 7 and 8 are perspective views respectively of the disk or head normally loose on the spindle to abut a shoulder on the spindle; the cutter blade holder and spacer with the cutter blades and spacer block assembled therewith; the clamping disk or head on the spindle; and the nut on the spindle for clamping the spacer blocks, cutter blades and the end disks or head toward the shoulder on the spindle.

Figure 1:
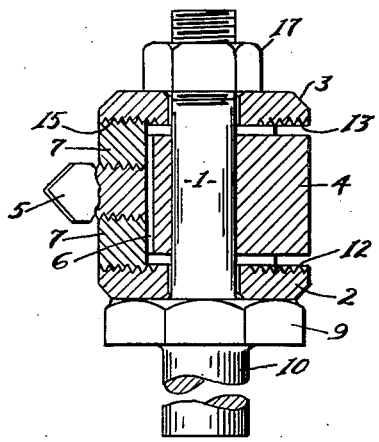
Figure 1 is an elevation, partly in section, of a shaper cutter unit embodying this invention.
Figure 3:
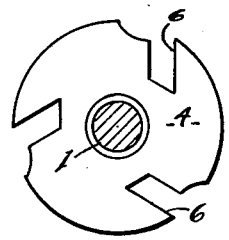
Figure 3 is an end elevation of the blade holder or spacer, the spindle being shown in section.
Figures 2, 4:
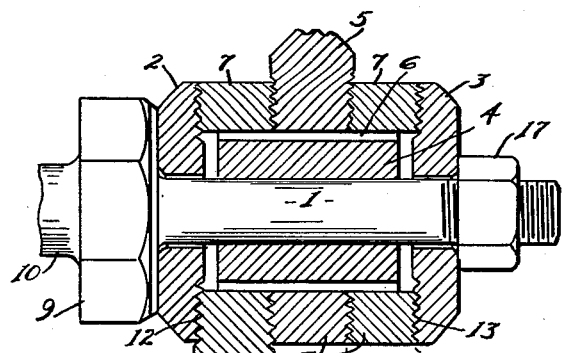
Figure 2 is a longitudinal sectional view, the portion of the work being cut being also shown.
Figure 4 is an isometric view of one of the spacer blocks.
Figures 5, 6, 7, 8:
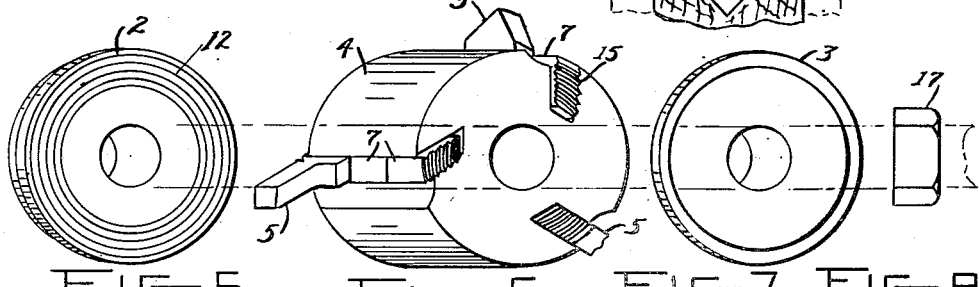
Figure 9:
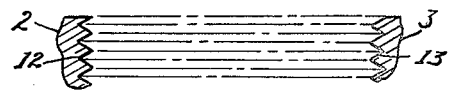

Figure 9 is a fragmentary sectional view of the opposing disks or heads showing the staggered arrangement of the ribs or teeth of the opposing disks.

The shaper unit comprises a spindle 1, usually arranged in upright position, opposing spaced discoidal heads or disks 2, 3, on the spindle and unkeyed thereto, a cylindrical blade holder or circumferential spacer 4 between the heads and also unkeyed to the spindle, circumferentially spaced cutter blades 5, here shown as three in number, seated in transverse slots designated 6 in the cylindrical blade holder 4, one blade in each slot, the cutter blades 5 being located out of circumferential alinement, and axial spacer blocks 7 in the portions of the slots unoccupied by the cutter blades, the total axial width of any cutter blade and the axial spacer blocks in any one slot being slightly greater than the axial length of the cylindrical blade holder or spacer 4.

The axial spacer blocks 7 and the cutter blade 5 in any one slot has means for interlocking with the end edges of the axial spacer blocks, or the cutter blades, or for interlocking with the heads or disks 2. A clamping nut on the spindle coacts with the outer head or disk 3 to clamp the axial spacer blocks and the cutter blades into interlocking engagement with each other or with the heads or disks 2, 3, and with each other, and also to clamp the head or disk 2 against a fixed collar 9 on the spindle 1 so that the shaper assembly rotates with the spindle 1 when the nut is tightened, and does not rotate with the spindle when the nut is not tightened. Thus, there is no liability of the cutter blades flying out centrifugally if the motor is started accidently or inadvertently, if the operator neglects to tighten the nut.

The spindle 1 is formed with a fixed shoulder or collar 9 against which the head or disk 2 thrusts, and with a stem 10 for fitting a chuck at one end of the shaft of a motor for actuating the spindle. The interlocking means on the heads or disks 2, 3, are annular concentric ribs or teeth 12, 13, triangular in cross section, which coact with arcuate ribs or teeth 15 on the edges of the axial spacer blocks 7, or on the edges of the cutter blades 5, as the case may be. The teeth or ribs 15 on one end of each axial spacer block 7, or on one end of the cutter blade 5, are staggered, as seen in Figure 9. The ribs or teeth 12, 13, on the disks 2, 3, are likewise staggered. One cutter blade 5 is located between the ends of the holder or circumferential spacer 4 and hence, axial spacer blocks 7 will be located on opposite sides of the cutter blade 5. The teeth or ribs on the outer edge of other cutter blades 5 will project beyond one end of the cylindrical cutter spacer 4, and the teeth of the outermost axial spacer will project beyond the other end of the slot 6 in the circumferential spacer 4. The ribs or teeth on the outermost sides of the axial spacer blocks or the outer sides of the cutter blades take into the teeth or ribs on the disks 2, 3. Thus, any one cutter blade is interlocked by the teeth or ribs with two axial spacer blocks 7 on opposite sides thereof and the axial spacer blocks 7 project beyond the ends of the cylindrical blade spacer 4 and interlock with the teeth 12, 13, of the discoidal heads 2, 3, at the opposite ends of the cylindrical blade spacer, and the ribs or teeth of the cutter blades at the ends of the slots 6 take in the ribs or teeth of the disk 2 or 3. Thus, the cutting edges in the projecting portions of the blades operate in different orbital paths. Also, the cut made by the cutter blades overlap slightly.

The disks 2, 3, are clamped by an axial movement on the spindle to engage the lower disk, as 2, against the discoidal collar 9, and are held or clutched by the compression of the nut 17 on the upper disk 3 by the engagement of the disk 2 with the collar 9.

Two of the cutter blades are located at opposite ends of the circumferential spacer or holder 4, and the teeth or ribs on the outer sides thereof are interlocked with the teeth or ribs of the disks 2, 3. Thus, the cutters or blades are held from radial displacement by the interlocking teeth or ribs on the cutters, spacers and disks.

Owing to the interlocking teeth of the disks 2, 3, the axial spacers 7 and the blades 5, the axial spacers and the cutter blades 5 are firmly held against axial and radial displacement. The cutting edges of the cutters may be ground of such shape as to cut any contour. Also, the inner end edges of the cutter blades and the axial spacers are held off the bottom of the slots in the cylindrical blade holder 4.

The opposing circular ribs or teeth on the end disks 2, 3, are staggered, or arranged with the apices and valleys of one in different concentric circles from the apices and valleys of the other. Assume that a cutter blade 5 is at the lower end of the slot in the cylindrical holder 4, and the remainder of that slot 6 is filled with two axial spacer blocks 7, and the operator desires to shift the cutter blade 5 say outward radially or inward one-half of a rib. He reverses the positions of the disks 2, 3—the disk 2 to the outer end or top of the spindle 1, and the disk 3 to the inner end or bottom against the shoulder 9, and then shifts the cutter blade 5 and spacers 7 outward, or inward. As the disks 2, 3, are reversed, but the cutter blade and spacers not reversed, the shift is from one tooth or rib of the disks 2, 3, to another on half the width of a tooth 12, 13. A similar operation takes place to shift the other two cutter blades 5 outward one-half of a rib or tooth (or inward). The blades 5, axial spacers 7, and disks 2, 3, are suitably marked to facilitate arranging and manipulation thereof. The radial adjustment of the cutter blades is always a small amount. The cutter blades and spacers 7 are arranged so that their edges at their inner ends are flush and spaced from the bottoms of the slots 6.

By reason of the staggered arrangement of the ribs or teeth 12, 13, on the disks 2, 3, and on the edges of the spacer blocks 7 and cutter blades and the reversibility of the disks, a fine radial adjustment of the cutter blades can be made, the adjustment being one-half of the width of the teeth 12, 13 and 15.

By this shaper unit, owing to the interlocking teeth there is no liability of the blades and other parts flying out and injuring the workman under the centrifugal force, and no liability of the unit rotating with the spindle if the motor is inadvertently or accidently started before the nut 17 is tightened. Owing to the location of the cutter blades to travel in different orbital paths and the spacing of the blades circumferentially so that but one blade is cutting at any instant, the load on the motor is greatly reduced.

What I claim is:

1. A shaper cutter unit comprising a spindle having end disks sleeved on the spindle, a cylindrical blade holder sleeved on the spindle between the end disks and formed with a lengthwise slot opening through its peripheral and end faces, axial spacer blocks and cutter blades in the slot, the disks, axial spacer blocks and cutter blades having interlocking projections to hold the blades and axial spacer blocks from radial displacement, and means on the spindle for clamping the disks on to the axial spacer blocks and the cutter blades and clamping the disks axially to the spindle to rotate therewith, the interlocking means comprising teeth located in concentric circles on opposing faces of the disks, arcuate teeth on opposite edges of the axial spacer blocks, and cutter blades for coacting with each other and with the circular teeth of the disks, the circular teeth on opposing faces of the disks being radially staggered, and the arcuate ribs on opposite edges of each axial spacer block and the cutter blades being correspondingly staggered, the end disks being reversible each for the other.

2. A shaper cutter unit comprising a spindle having end disks thereon, a cylindrical blade holder sleeved on the spindle between the end disks and formed with a lengthwise peripheral slot opening through the ends of the holder, the slot having parallel side walls, interchangeable axial spacer and cutter blocks fitting into the slot, said axial spacer and cutter blocks in the slot having a total axial width greater than the axial length of the cylindrical blade holder, the disks, axial spacer blocks and the cutter blocks having interlocking projections to hold the blocks from radial displacement out of the slots, means on the spindle for clamping the disks against the spacer blocks and the cutter blocks, and the blocks against each other, and also to clamp the disks for rotation with the spindle, the interlocking means comprising ribs located in concentric circles on the opposing faces of the disks, and complemental arcuate ribs on opposite edges of the adjacent spacer and the cutter blocks.

ELMER P. SACREY.

REFERENCES CITED

The following references are of record in the file of this patent:

UNITED STATES PATENTS

| Number | Name | Date |
|---|---|---|
| 420,522 | Sweet | Feb. 4, 1890 |
| 1,194,865 | Muller | Aug. 15, 1916 |
| 1,546,138 | Lambert | July 14, 1925 |
| 1,808,395 | Anderson | June 2, 1931 |

FOREIGN PATENTS

| Number | Country | Date |
|---|---|---|
| 232,580 | Germany | Mar. 17, 1911 |
| 457,187 | Germany | Mar. 10, 1928 |